Sept. 17, 1929.  G. E. JONES  1,728,613

SUPPORT HOOK

Filed June 11, 1927

INVENTOR:
G. E. Jones
BY H. J. Sanders
ATTORNEY

Patented Sept. 17, 1929

1,728,613

UNITED STATES PATENT OFFICE

GUSTAF EMIL JONES, OF JAMESTOWN, NEW YORK

SUPPORT HOOK

Application filed June 11, 1927. Serial No. 198,077.

This invention relates to improvements in support hooks and more particularly to a device which may be employed by carpenters, or other workers, to temporarily secure cross pieces to uprights until they can be nailed or otherwise securely fastened together.

With the foregoing and other objects in view the invention consists in the construction to be hereinafter fully described, particularly pointed out in the claim and illustrated in the drawing which forms a part of this application and in which—

Like reference characters denote corresponding parts in both views.

Figure 1:
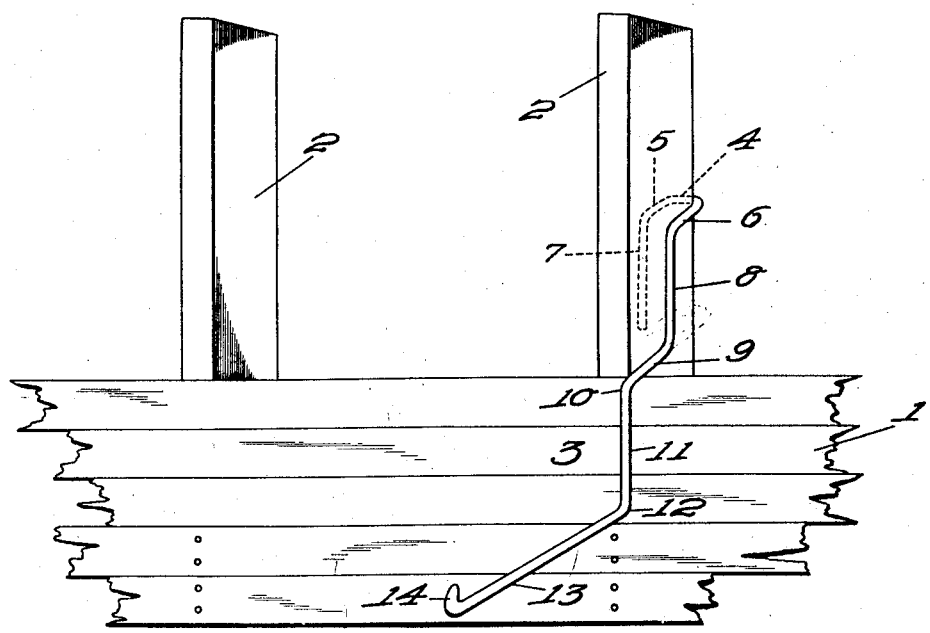
Fig. 1 is a view in perspective illustrating the use of the support hook to temporarily secure cross pieces, or rails, to the uprights to which said cross pieces are to be nailed.
Figure 2:
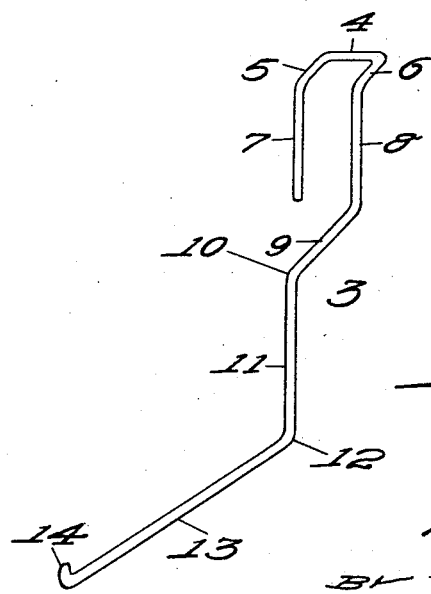
Fig. 2 is a view of the hook alone.

In the construction of wooden fences, frame enclosures, and in frame building construction generally it is frequently necessary to nail a number of cross pieces, rails or the like to upright supports, the rails being arranged one upon another. This work can be materially facilitated if several rails can be retained in position against the uprights while the nailing operation is in progress.

The present support hook is so designed that when properly applied to an upright it will automatically bear against and support in position several of the cross pieces to be carried until the cross pieces can be securely nailed in position. When two support hooks are used one may be applied to an upright at each end of the cross members so that the ends of the cross members are so firmly held in place as to make certain that the vibration or jarring incident to nailing one in place will not dislodge any of the others.

With two of the support hooks in use a workman can give his undivided attention to nailing the cross pieces in position whereas formerly it was necessary to manually hold them until they could be nailed.

The reference numeral 1 denotes cross pieces or rails which it is desired to nail to the uprights 2. By placing one, two or three of the cross pieces in position, the lowest unsecured cross piece either resting upon the highest nailed cross piece or upon the ground, the hook 3 is so engaged with upright 2 that a portion of the hook body will bear against the several unsecured cross pieces and so retain them positively in position.

The support hook 3 comprises the U-shaped portion 4, the sides 5, 6 thereof being bent at 90 degree angles to form the extensions 7, 8, the free end of the extension 7 marking one end of the support hook and the extension 8 being bent at approximately a 90 degree angle to form the arm 9 which at its outer end, or at the point 10, is bent again at a 90 degree angle to form the arm 11 which arm is substantially longer than the arm 9, in this instance about twice the length; and the arm 11 at its forward end 12 is bent at substantially a 90 degree angle to form the long arm 13 which terminates in the heel 14.

The several arms or portions 6, 8, 9, 11, 13 will, when the support hook is in operative position, lie in a common vertical plane, the portions 6, 9, 13 corresponding to the steps of a stairway and the portions 8, 11 to the risers. In use the base 4 of the U-shaped portion of the hook is placed in engagement with the remote vertical edge of the upright 2 at such a point that the arm 9 will rest upon the top edge of the uppermost unsecured cross member 1. The arm 11 will now rest against, or contiguous to, the lateral faces of one or more of the cross members, depending upon the width of those members and so prevent the dislodgement thereof.

The purpose of the heel 14 of the support hook is to permit a workman to place his foot upon the arm 13, the heel of his shoe resting against the heel 14 to more positively retain the cross pieces in position, if desired, by forcing the arm portion 11 against said pieces.

What is claimed is:—

A support hook, for use in rail fence construction, formed of a single piece of material bent to form an U-shaped portion for frictional engagement with a fence upright, the sides of said U-shaped portion being bent at 90 degree angles to form extensions running longitudinally of said upright, one of said extensions being bent at a 90 degree angle to form a short arm disposed to rest upon the uppermost fence rail, a long arm formed by bending said short arm at a 90 degree angle for disposal against a plurality of the upper fence rails, a second long arm formed by bending said first long arm at a 90 degree angle, and a heel terminating said second long arm, one of the sides of said U-shaped portion and said first long arm forming risers to afford leverage in the use of the hook.

In testimony that I claim the foregoing as my own I have hereto affixed my signature.

GUSTAF EMIL JONES.